United States Patent
Al Herz et al.

(10) Patent No.: US 11,866,660 B1
(45) Date of Patent: *Jan. 9, 2024

(54) PROCESS AND CATALYST FORMULATION FOR CRACKING CRUDE OIL

(71) Applicant: Saudi Arabian Oil Company, Dhahran (SA)

(72) Inventors: Mansour Ali Al Herz, Dhahran (SA); Aaron Akah, Dhahran (SA); Qi Xu, Dhahran (SA); Lianhui Ding, Dhahran (SA); Bander A. Al Ghamdi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/053,809

(22) Filed: Nov. 9, 2022

(51) Int. Cl.
*C10G 69/04* (2006.01)
*C10G 11/05* (2006.01)
(Continued)

(52) U.S. Cl.
CPC ............ *C10G 69/04* (2013.01); *B01J 29/088* (2013.01); *B01J 29/40* (2013.01); *B01J 29/80* (2013.01);
(Continued)

(58) Field of Classification Search
CPC ........ C10G 69/04; C10G 11/05; C10G 11/18; C10G 45/02; C10G 45/44;
(Continued)

(56) References Cited

U.S. PATENT DOCUMENTS

| 5,318,085 | A | 6/1994 | Vekselman |
|---|---|---|---|
| 7,019,187 | B2 | 3/2006 | Powers |

(Continued)

FOREIGN PATENT DOCUMENTS

| WO | 2009073436 A2 | 6/2009 |
|---|---|---|
| WO | 2010009077 A2 | 1/2010 |

(Continued)

OTHER PUBLICATIONS

U.S. Office Action dated Mar. 22, 2023 pertaining to U.S. Appl. No. 17/858,242, filed Jul. 6, 2022, pp. 1-18.
(Continued)

*Primary Examiner* — Ellen M McAvoy
*Assistant Examiner* — Chantel Graham
(74) *Attorney, Agent, or Firm* — DINSMORE & SHOHL LLP

(57) ABSTRACT

A process for converting crude oil may comprise contacting a crude oil with one or more hydroprocessing catalysts to produce a hydroprocessed effluent and contacting the hydroprocessed effluent with a fluidized catalytic cracking (FCC) catalyst composition in an FCC system to produce cracked effluent comprising at least olefins. The crude oil may have an API gravity from 25 to 29. The FCC system may operate at a temperature of greater than or equal to 580° C., a weight ratio of the FCC catalyst composition to the crude oil of from 2:1 to 10:1, and a residence time of from 0.1 seconds to 60 seconds. The FCC catalyst composition may comprise ultrastable Y-type zeolite (USY zeolite) impregnated with lanthanum; ZSM-5 zeolite impregnated with phosphorous; an alumina binder; colloidal silica; and a matrix material comprising Kaolin clay.

20 Claims, 1 Drawing Sheet

(51) Int. Cl.
*C10G 45/02* (2006.01)
*C10G 45/44* (2006.01)
*B01J 29/40* (2006.01)
*B01J 29/82* (2006.01)
*B01J 29/80* (2006.01)
*C10G 11/18* (2006.01)
*B01J 29/08* (2006.01)
*B01J 37/00* (2006.01)
*B01J 37/02* (2006.01)

(52) U.S. Cl.
CPC .......... *B01J 29/82* (2013.01); *B01J 37/0009* (2013.01); *B01J 37/0211* (2013.01); *C10G 11/05* (2013.01); *C10G 11/18* (2013.01); *C10G 45/02* (2013.01); *C10G 45/44* (2013.01); *B01J 2229/18* (2013.01); *C10G 2300/1033* (2013.01); *C10G 2300/301* (2013.01); *C10G 2300/308* (2013.01); *C10G 2300/4006* (2013.01); *C10G 2300/4018* (2013.01); *C10G 2300/70* (2013.01)

(58) Field of Classification Search
CPC ...... C10G 2300/1033; C10G 2300/301; C10G 2300/308; C10G 2300/4006; C10G 2300/4018; C10G 2300/70; B01J 29/088; B01J 29/40; B01J 29/80; B01J 29/82; B01J 37/0009; B01J 37/0211; B01J 2229/18
See application file for complete search history.

(56) References Cited

U.S. PATENT DOCUMENTS

| | | | |
|---|---|---|---|
| 8,137,533 | B2 | 3/2012 | Towler et al. |
| 10,059,642 | B1 | 8/2018 | Al-Herz et al. |
| 10,954,457 | B2 | 3/2021 | Al-Herz et al. |
| 2005/0211603 | A1 | 9/2005 | Guillaume et al. |
| 2011/0083996 | A1 | 4/2011 | Shafi et al. |
| 2014/0275673 | A1 | 9/2014 | Long et al. |
| 2017/0226433 | A1* | 8/2017 | Podrebarac ............ B01D 3/009 |
| 2018/0244591 | A1* | 8/2018 | Al-Herz ................. C10G 11/05 |
| 2019/0040328 | A1 | 2/2019 | Koseoglu |
| 2020/0255753 | A1 | 8/2020 | Al-Herz et al. |
| 2020/0291306 | A1* | 9/2020 | Aitani ................. C10G 51/026 |

FOREIGN PATENT DOCUMENTS

| | | |
|---|---|---|
| WO | 2010009082 A1 | 1/2010 |
| WO | 2010009089 A2 | 1/2010 |
| WO | 2013142563 A2 | 9/2013 |

OTHER PUBLICATIONS

U.S. Office Action dated Mar. 28, 2023 pertaining to U.S. Appl. No. 17/858,186, filed Jul. 6, 2022, pp. 1-14.

Al-Absi et al., "Thermal and catalytic cracking of whole crude oils at high severity", Journal of Analytical and Applied Pyrolysis, vol. 145, 11 pages, 2020.

* cited by examiner

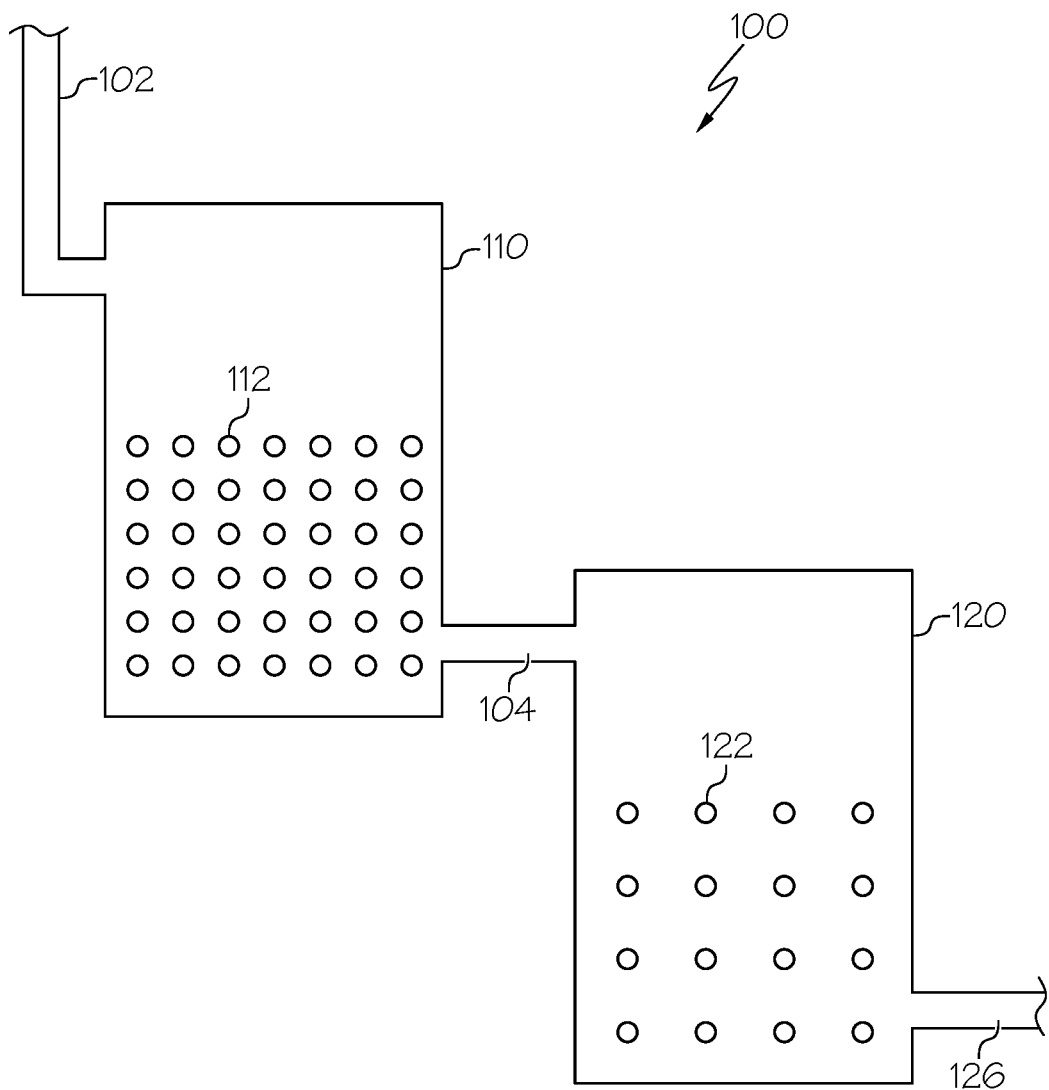

PROCESS AND CATALYST FORMULATION FOR CRACKING CRUDE OIL

BACKGROUND

Field

The present disclosure relates to processes and catalysts formulations for processing petroleum-based materials and, in particular, processes and catalyst compositions for cracking hydrocarbon feeds to produce chemical intermediates.

Technical Background

The worldwide increasing demand for light chemical intermediates remains a major challenge for many integrated refineries. In particular, the production of some valuable light olefins, such as ethylene and propylene, has attracted increased attention as pure olefin streams are considered the building blocks for polymer synthesis. The production of light olefins depends on several process variables, such as the feed type, operating conditions, and the type of catalyst. Despite the options available for producing a greater yield of propylene and light olefins, intense research activity in this field is still being conducted. For example, light olefins are typically produced through thermal cracking (or steam pyrolysis) of petroleum gases and distillates, such as naphtha, kerosene, or gas oil. Light olefins may also be produced through fluid catalytic cracking processes. Typical hydrocarbon feeds for fluid catalytic cracking processes range from hydrocracked bottoms to heavy feed fractions such as vacuum gas oil and atmospheric residue; however, these hydrocarbon feeds are limited in supply and at least in part, due to limitations of conventional catalysts and processes used in fluid catalytic cracking processes.

SUMMARY

Accordingly, there is an ongoing need for integrated processes which can produce intermediate chemical compounds from crude oil. The processes of the present disclosure include contacting a crude oil feed with one or more hydroprocessing catalysts to form a hydroprocessed effluent. The processes of the present disclosure further include contacting the hydroprocessed effluent with an FCC catalyst composition. In particular, the processes of the present disclosure include contacting the hydroprocessed effluent with an FCC catalyst composition that comprises a ZSM-5 zeolite and an ultrastable Y-type zeolite. The inclusion of these different zeolitic components can allow for increase in the selectivity and yield of light olefins across the entire range of some unconventional hydrocarbon feeds for fluid catalytic cracking processes, such as crude oil. Further, the FCC catalyst composition may demonstrate a reduced deactivation rate, which may improve the economics of light olefin production, among other features.

According to at least one embodiment of the present disclosure, a process for converting crude oil may comprise contacting a crude oil with one or more hydroprocessing catalysts to produce a hydroprocessed effluent and contacting the hydroprocessed effluent with a fluidized catalytic cracking (FCC) catalyst composition in an FCC system to produce cracked effluent comprising at least olefins. The crude oil may have an API gravity from 25 to 29. The FCC system may operate at a temperature of greater than or equal to 580° C., a weight ratio of the FCC catalyst composition to the crude oil of from 2:1 to 10:1, and a residence time of from 0.1 seconds to 60 seconds. The FCC catalyst composition may comprise ultrastable Y-type zeolite (USY zeolite) impregnated with lanthanum, ZSM-5 zeolite impregnated with phosphorous, an alumina binder, colloidal silica, and a matrix material comprising Kaolin clay.

Additional features and advantages of the embodiment of the present disclosure will be set forth in the detailed description that follows and, in part, will be readily apparent to a person of ordinary skill in the art from the detailed description or recognized by practicing the embodiments of the present disclosure.

BRIEF DESCRIPTION OF THE DRAWING

The following detailed description of the present disclosure may be better understood when read in conjunction with the following drawing in which:

FIG. 1 schematically depicts a generalized flow diagram of a system for converting a hydrocarbon feed to produce olefins, according to one or more aspects of the present disclosure.

When describing the simplified schematic illustration of FIG. 1, the numerous valves, temperature sensors, electronic controllers, and the like, which may be used and are well known to a person of ordinary skill in the art, are not included. Further, accompanying components that are often included in systems such as those depicted in FIG. 1, such as air supplies, heat exchangers, surge tanks, and the like are also not included. However, a person of ordinary skill in the art understands that these components are within the scope of the present disclosure.

Reference will now be made in greater detail to various aspects, some of which are illustrated in the accompanying drawings.

DETAILED DESCRIPTION

The present disclosure is directed to processes and catalysts for upgrading crude oil through hydroprocessing and fluidized catalytic cracking to produce greater value chemical products and intermediates, such as but not limited to light olefins, aromatic compounds, and combinations thereof. The processes of the present disclosure can enable conversion of heavy hydrocarbon feeds comprising crude oils, such as Arab Heavy crude oil. The processes and FCC catalyst compositions of the present disclosure can enable efficient cracking of crude oil feed streams while at the same time exhibiting a reduced rate of deactivation of the FCC catalyst composition due to contaminants and coke formation, among other features.

Definitions

As used in the present disclosure, the term "API" refers to the American Petroleum Institute.

As used in the present disclosure, the term "cracking" refers to a chemical reaction where a molecule having carbon-carbon bonds is broken into more than one molecule by the breaking of one or more of the carbon-carbon bonds; where a compound including a cyclic moiety, such as an aromatic, is converted to a compound that does not include a cyclic moiety; or where a molecule having carbon-carbon double bonds are reduced to carbon-carbon single bonds. As used in the present disclosure, the term "catalytic cracking" refers to cracking conducted in the presence of a catalyst. Some catalysts may have multiple forms of catalytic activity, and calling a catalyst by one particular function does not render that catalyst incapable of being catalytically active for other functionality.

As used in the present disclosure, the term "catalyst" refers to any substance that increases the rate of a specific chemical reaction, such as cracking reactions.

As used in the present disclosure, the term "crude oil" refers to a mixture of petroleum liquids and gases, including impurities, such as sulfur-containing compounds, nitrogen-containing compounds, and metal compounds, extracted directly from a subterranean formation or received from a desalting unit without having any fractions, such as naphtha, separated by distillation.

As used in the present disclosure, the term "naphtha" refers to an intermediate mixture of hydrocarbon-containing materials derived from crude oil refining and having atmospheric boiling points from 36 degrees Celsius (° C.) to 220° C. Naphtha may comprise light naphtha comprising hydrocarbon-containing materials having atmospheric boiling points from 36° C. to 80° C., intermediate naphtha comprising hydrocarbon-containing materials having atmospheric boiling points from 80° C. to 140° C., and heavy naphtha comprising hydrocarbon-containing materials having atmospheric boiling points from 140° C. to 200° C. Naphtha may comprise paraffinic, naphthenic, and aromatic hydrocarbons having from 4 carbon atoms to 11 carbon atoms.

As used in the present disclosure, the term "directly" refers to the passing of materials, such as an effluent, from a first component of the system to a second component of the system without passing the materials through any intervening components or systems operable to change the composition of the materials. Similarly, the term "directly" also refers to the introducing of materials, such as a feed, to a component of the system without passing the materials through any preliminary components operable to change the composition of the materials. Intervening or preliminary components or systems operable to change the composition of the materials can include reactors and separators, but are not generally intended to include heat exchangers, valves, pumps, sensors, or other ancillary components required for operation of a chemical process. Further, combining two streams together upstream of the second component instead of passing each stream to the second component separately is also not considered to be an intervening or preliminary component operable to change the composition of the materials.

As used in the present disclosure, the terms "downstream" and "upstream" refer to the positioning of components or systems relative to a direction of flow of materials through the system. For example, a second component may be considered "downstream" of a first component if materials flowing through the system encounter the first component before encountering the second component. Likewise, the first component may be considered "upstream" of the second component if the materials flowing through the system encounter the first component before encountering the second component.

As used in the present disclosure, the term "effluent" refers to a stream that is passed out of a reactor, a reaction zone, or a separator following a particular reaction or separation. Generally, an effluent has a different composition than the stream that entered the reactor, reaction zone, or separator. It should be understood that when an effluent is passed to another component or system, only a portion of that effluent may be passed. For example, a slipstream may carry some of the effluent away, meaning that only a portion of the effluent may enter the downstream component or system. The terms "reaction effluent" and "reactor effluent" particularly refer to a stream that is passed out of a reactor or reaction zone.

As used in the present disclosure, the term "high-severity conditions" refers to operating conditions of a fluid catalytic cracking system, such as the FCC system, that include temperatures greater than or equal to 580° C., or from 580° C. to 750° C., a catalyst to oil ratio greater than or equal to 1:1, or from 1:1 to 60:1, and a residence time of less than or equal to 60 seconds, or from 0.1 seconds to 60 seconds, each of which conditions may be more severe than typical operating conditions of fluid catalytic cracking systems.

As used in the present disclosure, the term "catalyst to oil ratio" or "CTO weight ratio" refers to the weight ratio of a catalyst to a process stream comprising hydrocarbons.

The term "residence time" refers to the amount of time that reactants are in contact with a catalyst, at reaction conditions, such as at the reaction temperature.

As used in the present disclosure, the term "reactor" refers to any vessel, container, conduit, or the like, in which a chemical reaction, such as catalytic cracking, occurs between one or more reactants optionally in the presence of one or more catalysts. A reactor can include one or a plurality of "reaction zones" disposed within the reactor. The term "reaction zone" refers to a region in a reactor where a particular reaction takes place.

As used in the present disclosure, the terms "separation unit" and "separator" refer to any separation device(s) that at least partially separates one or more chemical constituents in a mixture from one another. For example, a separation system selectively separates different chemical constituents from one another, forming one or more chemical fractions. Examples of separation systems include, without limitation, distillation columns, fractionators, flash drums, knock-out drums, knock-out pots, centrifuges, filtration devices, traps, scrubbers, expansion devices, membranes, solvent extraction devices, high-pressure separators, low-pressure separators, or combinations of these. The separation processes described in the present disclosure may not completely separate all of one chemical constituent from all of another chemical constituent. Instead, the separation processes described in the present disclosure "at least partially" separate different chemical constituents from one another and, even if not explicitly stated, separation can include only partial separation.

It should further be understood that streams may be named for the components of the stream, and the component for which the stream is named may be the major component of the stream (such as comprising from 50 wt. %, from 70 wt. %, from 90 wt. %, from 95 wt. %, from 99 wt. %, from 99.5 wt. %, or from 99.9 wt. % of the contents of the stream to 100 wt. % of the contents of the stream). It should also be understood that components of a stream are disclosed as passing from one system component to another when a stream comprising that component is disclosed as passing from that system component to another. For example, a disclosed "heavy oil stream" passing to a first system component or from a first system component to a second system component should be understood to equivalently disclose "heavy oil" passing to the first system component or passing from a first system component to a second system component.

The composition of feed streams and processing variables of FCC systems play a significant role in the reaction yields and heat balance within the systems. Conventional FCC systems and processes can require costly refining to produce suitable feed streams. Such additional costly refining can include separating and processing of one or more fractions of a hydrocarbon feedstock before introducing the refined conventional feed into the FCC system. These additional processing steps are energy intensive and reduce the amount of viable feed from an existing hydrocarbon source. Previous systems and methods have been developed to convert crude oil to greater value chemical products and intermediates directly through catalytic cracking to attempt to overcome these limitations, such as by reducing or eliminating the processing steps needed to produce a suitable hydrocarbon feed before introduction into an FCC system. However, contaminants, metals, or both present in heavy hydrocarbon feeds, such as crude oil, can deactivate the catalyst, resulting in decreased yields and increased production costs.

EMBODIMENTS

Accordingly, embodiments of the present disclosure are directed to an integrated processes for converting crude oil directly to greater value chemical products and intermediates, such as but not limited to olefins and aromatic compounds, through a combination of hydroprocessing and FCC using the reaction conditions and catalyst compositions that result in efficient processing and cracking of the crude oil, while resisting deactivation of the catalysts. The FCC catalyst composition of the present disclosure may include a ZSM-5 zeolite, an ultrastable Y-type zeolite, an alumina binder, a matrix material comprising Kaolin clay, and colloidal silica. The processes of the present disclosure may include contacting a crude oil feed stream with one or more hydroprocessing catalysts to form a hydroprocessed effluent. The processes may further include contacting the hydroprocessed effluent with the FCC catalyst composition in a FCC catalytic cracking system to convert at least a portion of the hydroprocessed effluent feed stream to light olefins, aromatic compounds, or both. The hydroprocessed effluent may contact the FCC catalyst composition under high severity conditions. The processes of the present disclosure can enable the crude oil to be directly converted to light olefins, aromatic compounds, or both efficiently while resisting deactivation, among other features.

Referring now to FIG. 1, the process 100 of the present disclosure for converting crude oil may comprise contacting a crude oil 102 with one or more hydroprocessing catalysts 112 to produce a hydroprocessed effluent 104 and contacting the hydroprocessed effluent 104 with a fluidized catalytic cracking (FCC) catalyst composition 122 in an FCC system 120 to produce cracked effluent 126 comprising at least olefins.

The feedstock to the present process 100 may be a crude oil 102. The "crude oil" 102 may be a raw hydrocarbon which has not been previously processed, such as through one or more of distillation, cracking, hydroprocessing, desalting, or dehydration. In embodiments, the crude oil 102 may have undergone at least some processing, such as desalting, solids separation, scrubbing, or combinations of these, but has not been subjected to distillation. For instance, the crude oil 102 may be a de-salted crude oil that has been subjected to a de-salting process. In embodiments, crude oil 102 may not have undergone pretreatment, separation (such as distillation), or other operation that changes the hydrocarbon composition of the crude oil prior to introducing the crude oil 102 to the process 100. As used herein, the "hydrocarbon composition" of the crude oil refers to the composition of the hydrocarbon constituents of the crude oil 102 and does not include entrained non-hydrocarbon solids, salts, water, or other non-hydrocarbon constituents.

The crude oil 102 may have an American Petroleum Institute (API) gravity of from 25 to 30. For example, the crude oil may have an API gravity from 25 to 29, from 25 to 28, from 26 to 30, from 26 to 29, from 26 to 28, from 27 to 30, from 27 to 28, or any subset thereof. The crude oil may have a density of greater than 0.8 grams per milliliter (g/ml), greater than 0.82 g/ml, greater than 0.84 g/ml, 0.86 g/ml, 0.88 g/ml, from 0.8 g/ml to 1.0 g/ml, from 0.84 to 0.96 g/ml, from 0.86 g/ml to 0.93 g/ml, from 0.87 g/ml to 0.902 g/ml, from 0.87 g/ml to 0.89 g/ml, or any subset thereof, at a temperature of 15 degrees Celsius. According to some embodiments, the crude oil 102 may be an Arab Heavy crude oil. Properties for an exemplary grade of Arab heavy crude may be found in Tables 2-3.

The crude oil 102 may have an initial boiling point from 30° C. to 50° C. For example, the crude oil 102 may have an initial boiling point from 30° C. to 45° C., from 30° C. to 40° C., from 30° C. to 35° C., from 35° C. to 50° C., from 40° C. to 50° C., from 45° C. to 50° C., or any subset thereof. The initial boiling point may be determined according to standard test method ASTM D7169.

The crude oil 102 may have an end boiling point (also referred to herein as "EBP" and "FBP") greater than 720 degrees Celsius. For example, the crude oil 102 may have an end boiling point greater than 740° C., greater than 760° C., greater than 780° C., greater than 800° C., greater than 850° C., greater than 900° C., greater than 950° C., or greater than 1000° C. The crude oil 102 may have an end boiling point less than 2000° C., less than 1800° C., less than 1600° C., less than 1400° C., less than 1200° C., less than 1000° C., less than 900° C., less than 800° C., less than 750° C., or any subset thereof. The end boiling point may be determined according to standard test method ASTM D7169.

At least 50 weight percent of the crude oil 102 may have a boiling point temperature greater than or equal to 300° C. For example, the crude oil may have a 50 wt. % boiling point temperature from 300° C. to 500° C., from 300° C. to 475° C., from 300° C. to 450° C., from 300° C. to 425° C., from 300° C. to 400° C., from 300° C. to 375° C., 350° C. to 500° C., from 350° C. to 475° C., from 350° C. to 450° C., from 350° C. to 425° C., from 350° C. to 400° C., from 350° C. to 375° C., 375° C. to 500° C., from 375° C. to 475° C., from 375° C. to 450° C., from 375° C. to 425° C., from 375° C. to 400° C., or any subset thereof. The 50 weight percent boiling temperature may be determined according to standard test method ASTM D7169.

The crude oil 102 may have a concentration of nitrogen of less than or equal to 5000 parts per million by weight (ppmw). For example, the crude oil 102 may have a nitrogen concentration of less than 4500 ppmw, less than 4000 ppmw, less than 3500 ppmw, less than 3000 ppmw, less than 2500 ppmw, less than 2000 ppmw, from 1000 ppmw to 5000 ppmw, from 1000 to 4000 ppmw, from 1000 ppmw to 3000 ppmw, from 1000 ppmw to 2000 ppmw, or any subset thereof. The nitrogen concentration of the crude oil 102 may be determined according to standard test method ASTM D4629.

The crude oil 102 may have a concentration of paraffin compounds of less than 50 wt. % per unit weight of the crude oil. For example, the crude oil 102 may have a concentration of paraffin compounds of less than or equal to 40 wt. %, less than or equal to 35 wt. %, less than or equal to 30 wt. %, less than or equal to 25 wt. %, less than or equal to 20 wt. %, less than or equal to 15 wt. %, less than or equal to 10 wt. %, or even less than or equal to 5 wt. %, per unit weight of the hydrocarbon feed, In embodiments, the crude oil 102 may have a concentration of paraffin compounds of from 5 wt. % to less than 50 wt. %, from 5 wt. % to 40 wt. %, from 5 wt. % to 35 wt. %, from 5 wt. % to 30 wt. %, from 5 wt. % to 25 wt. %, from 5 wt. % to 20 wt. %, from 10 wt. % to less than 50 wt. %, from 10 wt. % to 40 wt. %, from 10 wt. % to 35 wt. %, from 10 wt. % to 30 wt. %, from 10 wt. % to 25 wt. %, or even from 10 wt. % to 20 wt. % per unit weight of the crude oil 102. The paraffin content of the crude oil 102 may be determined according to ASTM 5443.

The crude oil 102 may have a concentration of aromatic compounds of greater than or equal to 20 wt. % per unit weight of the crude oil. For example, the crude oil 102 may have a concentration of aromatic compounds of greater than or equal to 30 wt. %, greater than or equal to 40 wt. %, or even greater than or equal to 50 wt. % per unit weight of the crude oil 102, as determined according to ASTM 5443. In embodiments, the crude oil 102 may have a concentration of aromatic compounds of from 20 wt. % to 90 wt. %, from 20 wt. % to 80 wt. %, from 20 wt. % to 70 wt. %, from 30 wt. % to 90 wt. %, from 30 wt. % to 80 wt. %, from 30 wt. % to 70 wt. %, from 40 wt. % to 90 wt. %, from 40 wt. % to 80 wt. %, from 40 wt. % to 70 wt. %, from 50 wt. % to 90 wt. %, from 50 wt. % to 80 wt. %, from 50 wt. % to 70 wt. %, or any subset thereof, per unit weight of the crude oil 102.

The crude oil 102 may have a concentration of naphthenes of greater than or equal to 10 wt. % per unit weight of the crude oil. For example, the crude oil 102 may have a concentration of naphthenes greater than or equal to 15 wt. %, greater than or equal to 20 wt. %, greater than or equal to 25 wt. %, or greater than or equal to 27 wt. % per unit weight of the crude oil 102, as determined according to ASTM 5443. In embodiments, the crude oil 102 can have a concentration of naphthenes of from 25 wt. % to 60 wt. %, from 25 wt. % to 50 wt. %, from 25 wt. % to 40 wt. %, from 25 wt. % to 35 wt. %, from 27 wt. % to 60 wt. %, from 27 wt. % to 50 wt. %, from 27 wt. % to 40 wt. %, from 27 wt. % to 35 wt. %, or any subset thereof per unit weight of the crude oil 102.

In some embodiments, the crude oil 102 may be a topped crude oil. As used in the present disclosure, the term "topped crude oil" refers to crude oil from which lesser boiling constituents have been removed through distillation, such as constituents having boiling point temperatures less than 180° C. or even less than 160° C. The crude oil 102 may comprise, consist of, or consist essentially of a topped crude oil, which has greater than or equal to 95%, greater than or equal to 98%, or even greater than or equal to 99% constituents having boiling point temperatures greater than or equal to 160° C. or greater than or equal to 180° C., depending on the cut point temperature of the topping unit.

In embodiments, one or more supplemental feeds (not depicted) may be mixed with the crude oil 102 prior to introducing the crude oil 102 to the one or more hydroprocessing catalyst or introduced independently to the one or more hydroprocessing catalysts 112 in addition to the crude oil 102. In alternate embodiments, the crude oil 102 may be introduced to the one or more hydroprocessing catalysts 112 independently, in the absence of other such feeds.

The crude oil 102 may contact the one or more hydroprocessing catalysts 112 in a hydroprocessing system 110. The hydroprocessing system 110 may be a single reactor or a series of reactors directly connected. Where there are more than one hydroprocessing catalysts 112, the catalysts may be arranged in distinct beds, the catalysts may be positioned in individual reactors, or the catalysts may be mixed in a single reactor. The crude oil 102 may contact the one or more hydroprocessing catalysts 112 in a down flow manner.

The one or more hydroprocessing catalysts 112 may include one or more of a hydrodemetallization (also referred to as "HDM") catalyst, a hydrodesulfurization (also referred to as "HDS") catalyst, and a hydrodearomatization (also referred to as "HDA") catalyst. In some embodiments, the one or more hydroprocessing catalysts 112 may include a hydrodemetallization catalyst, a hydrodesulfurization catalyst, and a hydrodearomatization catalyst. In further embodiments, the one or more hydroprocessing catalysts 112 may further include hydrodenitrogenation catalysts, hydrodeoxygenation catalysts, or both.

The one or more hydroprocessing catalysts 112 may be arranged in any order. For example, the one or more hydroprocessing catalysts 112 may be arranged such that the crude oil 102 first contacts the HDM catalyst, then the HDS catalyst, then the HDA catalyst. Alternately, the one or more hydroprocessing catalysts 112 may be arranged such that the crude oil contacts the HDM, then the HDA, then the HDS; or contacts the HDS, HDA, HDM; or contacts the HDS, then the HDM, then the HDA; or contacts the HDA, then the HDS, then the HDM; or contacts the HDA, then the HDM, then the HDS catalyst. In some embodiments, the HDM and HDS catalysts may be positioned upstream of the HDA catalyst. Without being limited by theory, it is believed that positioning the HDA catalyst after the HDS and HDM catalysts may protect the HDA catalyst from deactivation.

In alternate embodiments only one or two of the one or more hydroprocessing catalysts 112 may be present. The one or more hydroprocessing catalysts 112 may be arranged such that the crude oil contacts the HDM then the HDA, or the HDA then the HDM, or the HDS then the HDA, or the HDA then the HDS, or the HDM then the HDS, or the HDS then the HDM catalysts.

In embodiments where the catalysts form a mixed bed, the crude oil may contact the one or more hydroprocessing catalysts 112 in a random or simultaneous manner.

The HDM catalyst may comprise one or more metals from the Groups 5, 6, or 8-10 of the IUPAC periodic table. For example, the HDM catalyst may comprise molybdenum. The HDM catalyst may further comprise a support material, and the metal may be disposed on the support material. The support material may be gamma-alumina or silica/alumina extrudates, spheres, cylinders, beads, pellets, and combinations thereof. In some embodiments, the HDM catalyst may comprise a gamma-alumina support, with a surface area of from 100 meters squared per gram (m2/g) to 160 m2/g, such as from 100 m2/g to 130 m2/g, or from 130 m2/g to 160 m2/g. In one embodiment, the HDM catalyst may comprise a molybdenum metal catalyst on an alumina support (sometimes referred to as "Mo/Al2O3 catalyst"). It should be understood throughout this disclosure that metals contained in any of the disclosed catalysts may be present as sulfides or oxides, or even other compounds.

In some embodiments, the HDM catalyst may comprise from 0.5 wt. % to 12 wt. % of an oxide or sulfide of molybdenum, such as from 2 wt. % to 10 wt. % or from 3 wt. % to 7 wt. % of an oxide or sulfide of molybdenum, and from 88 wt. % to 99.5 wt. % of alumina, such as from 90 wt. % to 98 wt. % or from 93 wt. % to 97 wt. % of alumina.

The HDM catalyst may have a relatively large pore volume, such as at least 0.8 cubic centimeters per gram (cm3/g) (for example, at least 0.9 cm3/g, or even at least 1.0 cm3/g). The pore size of the HDM catalyst may be predominantly macroporous (that is, having a pore size of greater than 50 nanometers (nm)). Without being limited by theory, it is believed that this pore structure and volume may provide a large capacity for the uptake of metals, and optionally dopants, on the surfaces of the HDM catalyst. In one embodiment, the HDM catalyst may include a dopant comprising one or more compounds that include elements selected from the group consisting of boron, silicon, halogens, phosphorus, and combinations thereof.

An exemplary HDM catalyst may include KFR-22 from Albermarle Corp.

The HDS catalyst may comprise one or more metals from the Groups 5, 6, or 8-10 of the IUPAC periodic table. The HDS catalyst may comprise one or more metal from Group 6 and one metal from Groups 8-10 of the IUPAC periodic table. Examples of Group 6 metals include molybdenum and tungsten and examples of Group 8-10 metals include nickel and cobalt. The HDS catalyst may further comprise a support material, and the metal may be disposed on the support material. In some embodiments, the HDS catalyst may comprise Mo and Ni on an alumina support (sometimes referred to as a "Mo—Ni/Al2O3 catalyst"). The HDS catalyst may also contain a dopant that is selected from the group consisting of boron, phosphorus, halogens, silicon, and combinations thereof. In one or more embodiments, the HDS catalyst may comprise from 10 wt. % to 18 wt. % of an oxide or sulfide of molybdenum, such as from 11 wt. % to 17 wt. % or from 12 wt. % to 16 wt. % of an oxide or sulfide of molybdenum, from 1 wt. % to 7 wt. % of an oxide or sulfide of nickel, such as from 2 wt. % to 6 wt. % or from 3 wt. % to 5 wt. % of an oxide or sulfide of nickel, and from 75 wt. % to 89 wt. % of alumina such as from 77 wt. % to 87 wt. % or from 79 wt. % to 85 wt. % of alumina.

The HDS catalyst may have a surface area of 140 m$^2$/g to 200 m$^2$/g, such as from 140 m$^2$/g to 170 m$^2$/g or from 170 m$^2$/g to 200 m$^2$/g. The HDS catalyst may have an intermediate pore volume of from 0.5 cm$^3$/g to 0.7 cm$^3$/g, such as 0.6 cm$^3$/g. The HDS catalyst may generally comprise a mesoporous structure having pore sizes in the range of 12 nm to 50 nm.

An exemplary HDS catalyst may include KFR-33 from Albermarle Corp.

The HDA catalyst may comprise one or more metals from Groups 5, 6, 8, 9, or 10 of the IUPAC periodic table. In some embodiments, the HDA catalyst may comprise one or more metals from Groups 5 or 6 of the IUPAC periodic table, and one or more metals from Groups 8, 9, or 10 of the IUPAC periodic table. In some embodiments, the HDA catalyst may comprise molybdenum or tungsten from Group 6 and nickel or cobalt from Groups 8, 9, or 10. The HDA catalyst may further comprise a support material, such as zeolite, and the metal may be disposed on the support material. In one embodiment, the HDA catalyst may comprise tungsten and nickel metal catalyst on a zeolite support that is mesoporous (sometimes referred to as "W—Ni/meso-zeolite catalyst"). In another embodiment, the HDA catalyst may comprise molybdenum and nickel metal catalyst on a zeolite support that is mesoporous (sometimes referred to as "Mo—Ni/meso-zeolite catalyst"). The zeolite support material may not be limited to any particular type of zeolite. However, it is contemplated that zeolites such as Y, Beta, AWLZ-15, LZ-45, Y-82, Y-84, LZ-210, LZ-25, Silicalite, or mordenite framework zeolites may be suitable for use in the presently-described HDA catalyst.

The support material (that is, the mesoporous zeolite) of the HDA catalyst may be characterized as mesoporous by having average pore size of from 2 nm to 50 nm. Without being bound by theory, it is believed that the relatively large-sized pores (that is, mesoporosity) allow for larger molecules to diffuse inside the zeolite, which is believed to enhance the reaction activity and selectivity of the catalyst. Because of the increased pore size, aromatic-containing molecules can more easily diffuse into the catalyst and aromatic cracking may increase. For example, in some conventional embodiments, the feedstock converted by the hydroprocessing catalysts may be vacuum gas oils; light cycle oils from, for example, a fluid catalytic cracking reactor; or coker gas oils from, for example, a coking unit. The molecular sizes in these oils are relatively small compared to those of heavy oils such as crude and atmosphere residue, which may be the feedstock of the present methods and systems. The heavy oils generally are unable to diffuse inside the conventional zeolites and be converted on the active sites located inside the zeolites. Therefore, zeolites with larger pore sizes (that is, mesoporous zeolites) may allow the larger molecules of heavy oils to overcome the diffusion limitation, and may promote the reaction and conversion of the larger molecules of the heavy oils.

In one or more embodiments, the HDA catalyst may comprise from 18 wt. % to 28 wt. % of a sulfide or oxide of tungsten, such as from 20 wt. % to 27 wt. % or from 22 wt. % to 26 wt. % of tungsten or a sulfide or oxide of tungsten, from 2 wt. % to 8 wt. % of an oxide or sulfide of nickel, such as from 3 wt. % to 7 wt. % or from 4 wt. % to 6 wt. % of an oxide or sulfide of nickel, and from 5 wt. % to 40 wt. % of mesoporous zeolite, such as from 10 wt. % to 35 wt. % or from 10 wt. % to 30 wt. % of zeolite. In another embodiment, the HDA catalyst may comprise from 12 wt. % to 18 wt. % of an oxide or sulfide of molybdenum, such as from 13 wt. % to 17 wt. % or from 14 wt. % to 16 wt. % of an oxide or sulfide of molybdenum, from 2 wt. % to 8 wt. % of an oxide or sulfide of nickel, such as from 3 wt. % to 7 wt. % or from 4 wt. % to 6 wt. % of an oxide or sulfide of nickel, and from 5 wt. % to 40 wt. % of mesoporous zeolite, such as from 10 wt. % to 35 wt. % or from 10 wt. % to 30 wt. % of mesoporous zeolite.

It should be understood that some embodiments of the presently-described methods and systems may utilize a HDA catalyst that includes a mesoporous zeolite (that is, having an average pore size of from 2 nm to 50 nm). However, in other embodiments, the average pore size of the zeolite may be less than 2 nm (that is, microporous).

An exemplary HDA catalyst may include KFR-70 from Albermarle Corp.

The crude oil 102 may contact the one or more hydroprocessing catalysts 112 at a temperature of at least 300° C., at least 325° C., at least 350° C., at least 375° C., or at least 400° C. The crude oil 102 may contact the one or more hydroprocessing catalysts 112 at a temperature of less than 1000° C., less than 800° C., less than 600° C., less than 500° C., or less than 450° C.

The crude oil 102 may contact the one or more hydroprocessing catalysts 112 in the presence of hydrogen. For example, the atmosphere in which the crude oil 102 contacts the one or more hydroprocessing catalysts 112 may be at least 10 mol. % hydrogen, at least 25 mol. % hydrogen, at least 50 mol. % hydrogen, at least 75 mol. % hydrogen, at least 90 mol. % hydrogen, or even at least 99 mol. % hydrogen.

The crude oil 102 may contact the one or more hydroprocessing catalysts 112 at a pressure of at least 75 bar, at least 100 bar, at least 125 bar, or at least 150 bar.

The crude oil may contact the one or more hydroprocessing catalysts at a hydrogen/oil ratio of at least 600. For example, the crude oil may contact the one or more hydroprocessing catalysts at a hydrogen/oil ratio of at least 800, at least 1000, at least 1200, from 600 to 1500, from 800 to 1400, from 1100 to 1300, or any subset thereof.

The crude oil 102 may contact the one or more hydroprocessing catalysts 112 at a liquid hourly space velocity (LHSV) of greater than 0.1 h$^{-1}$, greater than 0.2 h$^{-1}$, greater than 0.25 h$^{-1}$, greater than 0.28 h$^{-1}$, less than 0.5 h$^{-1}$, less than 0.4 h$^{-1}$, less than 0.35 h$^{-1}$, less than 0.32 h$^{-1}$, from 0.1 h$^{-1}$ to 0.5 h$^{-1}$, from 0.2 h$^{-1}$ to 0.4 h$^{-1}$, from 0.25 h$^{-1}$ to 0.35 h$^{-1}$, from 0.28 h$^{-1}$ to 0.32 h$^{-1}$, or any subset thereof.

The hydroprocessed effluent 104 may be fed directly from the hydroprocessing system 110 to the FCC system 120. In alternate embodiments, the hydroprocessing effluent 104 may undergo additional processing steps between exiting the hydroprocessing system 110 and being fed to the FCC system 120.

At least 50 wt. % of the hydroprocessed effluent 104 may have a boiling point temperature of at least 300° C., such as at least 310° C., or at least 315° C. At least 50 wt. % of the hydroprocessed effluent 104 may have a boiling point temperature of less than 400° C., less than 380° C., less than 360° C., less than 340° C., or less than 325° C. The 50 wt. % boiling point temperature may be determined according to standard test method ASTM D7169.

The hydroprocessed effluent 104 may have a nitrogen content of less than 30%, less than 25%, less than 20%, less than 15%, or less than 10% of the nitrogen content of the crude oil 102. The nitrogen content may be measured according to standard test method ASTM D-4629.

The hydroprocessed effluent 104 may have a sulfur content of less than 20%, less than 15%, less than 10%, less than 5%, less than 4%, or less than 3%, of the sulfur content of the crude oil 102. The sulfur content may be measured according to standard test method ASTM D-4294.

The processes of the present disclosure include passing the hydroprocessed effluent 104 from the hydroprocessor 110 to an FCC system 120 comprising the FCC catalyst composition 122. The hydroprocessed effluent 104 may be passed directly to the FCC system 120. In some embodiments, the FCC system 120 may be a down-flow FCC system. In alternate embodiments, the FCC system 120 may be an up-flow FCC system.

The FCC system may operate at a temperature of greater than or equal to 580° C. For example, the FCC system may operate at a temperature of greater than 600° C., greater than 620° C., greater than 640° C., or greater than 645° C.

The FCC catalyst 122 may contact the hydroprocessed effluent 104 under high-severity reaction conditions. For example, the FCC catalyst 122 may contact the hydroprocessed effluent 104 at a reaction temperature of greater than 580° C., such as from 580° C. to 750° C., from 580° C. to 740° C., from 580° C. to 720° C., from 580° C. to 700° C., from 580° C. to 680° C., from 580° C. to 660° C., from 580° C. to 650° C., from 600° C. to 750° C., from 600° C. to 740° C., from 600° C. to 720° C., from 600° C. to 700° C., from 600° C. to 680° C., from 600° C. to 660° C., from 600° C. to 650° C., from 620° C. to 750° C., from 620° C. to 740° C., from 620° C. to 720° C., from 620° C. to 700° C., from 620° C. to 680° C., from 620° C. to 660° C., or from 620° C. to 650° C. When the reaction temperature is greater than, for instance, 750° C., the hydroprocessed effluent 104 may undergo increased thermal cracking and decreased catalytic cracking compared to embodiments where the reaction temperature is less than 750° C. Without being limited by theory, it is believed that thermal cracking of the hydroprocessed effluent can increase yield of ethylene and decrease yield of other products. In embodiments, the hydroprocessed effluent can be contacted with the FCC catalyst composition 122 at a temperature of from 600° C. to 650° C. Catalytic cracking of the hydroprocessed effluent 104 in the fluid catalytic cracking unit 120 can yield a greater number of desired products, such as light olefins and aromatics.

The weight ratio of the FCC catalyst composition to the crude oil may be from 2:1 to 10:1, such as from 2:1 to 8:1, from 2:1 to 6:1, from 2:1 to 4:1, from 4:1 to 10:1, from 6:1 to 10:1, or from 8:1 to 10:1.

The fluid catalytic cracking system 120 may be operated with a catalyst-to-oil weight (CTO) ratio from 2:1 to 10:1, where the catalyst-to-oil weight ratio is the weight ratio of the FCC catalyst composition 122 to the weight of the hydroprocessed effluent 104 in a unit volume of the reaction mixture comprising the hydroprocessed effluent 104 and the FCC catalyst composition 122. For example, the fluid catalytic cracking system 120 can be operated with a catalyst-to-oil weight ratio from 2:1 to 3:1, from 2:1 to 5:1, from 2:1 to 10:1, from 3:1 to 5:1, or from 5:1 to 10:1. Without being bound by theory, it is believed that a catalyst-to-oil weight ratio less than 2:1 may not provide a sufficient amount of catalyst present to catalytically crack the hydroprocessed effluent 104 at an economically high yield. It is believed that a catalyst-to-oil weight ratio greater than 10:1 may not be economically practical for scaling up in commercial applications.

The hydroprocessed effluent 104 may contact the FCC catalyst composition 122 with a residence time of from 0.1 to 60 seconds. For example, the hydroprocessed effluent may contact the FCC catalyst composition with a residence time of from 5 to 60 seconds, from 10 to 60 seconds, from 20 to 60 seconds, from 30 to 60 seconds, from 40 to 60 seconds, from 50 to 60 seconds, from 0.1 to 50 seconds, from 0.1 to 40 seconds, from 0.1 to 30 seconds, from 0.1 to 20 seconds, from 0.1 to 10 seconds, from 10 to 50 seconds, from 20 to 40 seconds, or any subset thereof. Without intending to be bound by any particular theory, it is believed that a residence time less than 0.1 seconds may not provide sufficient time for hydrocarbons in the hydroprocessed effluent 104 to be sufficiently cracked by the FCC catalyst composition 122.

The FCC catalyst composition 122 may comprise ultrastable Y-type zeolite (USY zeolite) impregnated with lanthanum, ZSM-5 zeolite impregnated with phosphorous, an alumina binder, colloidal silica, and a matrix material comprising Kaolin clay.

The FCC catalyst composition may comprise from 1 to 40 wt. % ZSM-5 zeolite impregnated with phosphorous, from 1 to 40 wt. % USY zeolite impregnated with lanthanum, from 2 to 20 wt. % alumina binder, from 0.5 to 5 wt. % colloidal silica, and from 30 to 70 wt. % matrix material, or any subset thereof.

According to some embodiments, the FCC catalyst composition may comprise from 19 to 23 wt. % USY zeolite impregnated with lanthanum, from 18 to 22 wt. % ZSM-5 zeolite impregnated with phosphorous, from 6 to 10 wt. % alumina binder, from 47 to 51 wt. % Kaolin clay, and from 0.1 to 4 wt. % colloidal silica, wherein the weight percentages are based on the total weight of the FCC catalyst composition.

According to some specific embodiments, the FCC catalyst composition 122 may comprise about 20 wt. % ZSM-5 zeolite based on the total weight of the FCC catalyst composition 122, where the ZSM-5 zeolite is impregnated with about 7.5 wt. % P$_2$O$_5$ based on the total weight of the ZSM-5 zeolite; about 21 wt. % USY zeolite based on the total weight of the FCC catalyst composition 122, where the USY zeolite is impregnated with about 2.5 wt. % lanthanum oxide (La$_2$O$_3$) based on the total weight of the USY zeolite; about 8 wt. % alumina binder based on the total weight of the FCC catalyst composition 122; about 49 wt. % Kaolin clay based on the total weight of the FCC catalyst composition 122; and about 2 wt. % colloidal silica based on the total weight of the FCC catalyst composition 122.

The ZSM-5 zeolite in the FCC catalyst composition 122 may be operable to crack at least a portion of the hydroprocessed effluent 104, to produce one or more light olefins, such as ethylene and propylene. Without being bound by any particular theory, it is believed that the ZSM-5 zeolite may have a greater propensity to crack the relatively lighter hydrocarbons, such as those present in the hydroprocessed effluent 104 and those produced by the catalytic cracking of heavier hydrocarbons by the Y-type zeolite. As a result, the inclusion of the ZSM-5 zeolite may increase the yield of products, such as light olefins, when compared to FCC catalysts that do not include the ZSM-5 zeolite. As used in the present disclosure, "ZSM-5" refers to zeolites having an MFI framework type according to the IUPAC zeolite nomenclature and consisting of silica and alumina. ZSM-5 refers to "Zeolite Socony Mobil-5" and is a pentasil family zeolite that can be represented by the chemical formula Na$_n$Al$_n$Si$_{96-n}$O$_{192}$·16H$_2$O, where 0<n<27. The molar ratio of silica to alumina in the ZSM-5 may be at least 5, at least 10, at least 25, at least 30 or even at least 50. In embodiments, the molar ratio of silica to alumina in the ZSM-5 may be from 5 to 50, from 5 to 40, from 5 to 35, from 10 to 50, from 10 to 40, from 10 to 35, from 20 to 50, from 20 to 40, from 20 to 35, from 30 to 50, or from 30 to 40.

The ZSM-5 zeolite may have an average surface area from 200 meters squared per gram (m$^2$/g) to 800 m$^2$/g. In embodiments, the average surface area may be from 200 m$^2$/g to 400 m$^2$/g, from 200 m$^2$/g to 600 m$^2$/g, from 200 m$^2$/g to 800 m$^2$/g, from 300 m$^2$/g to 400 m$^2$/g, from 300 m$^2$/g to 600 m$^2$/g, from 300 m$^2$/g to 800 m$^2$/g, from 400 m$^2$/g to 600 m$^2$/g, or from 400 m$^2$/g to 800 m$^2$/g. In embodiments, the ZSM-5 zeolite, can have an average total pore volume per unit weight of the ZSM-5 zeolite of from 0.010 milliliters per gram (mL/g) to 0.500 mL/g, such as from 0.050 mL/g to 0.500 mL/g, from 0.010 mL/g to 0.300 mL/g, or from 0.050 mL/g to 0.300 mL/g.

One or more of the zeolitic components of the FCC catalyst composition 122 may include one or more phosphorous-containing compounds, such as phosphorous pentoxide (P$_2$O$_5$). Without being bound by any particular theory, it is believed that phosphorus-containing compounds may stabilize the structure of the zeolitic framework structure by preventing the segregation of the framework alumina, which can improve the hydrothermal stability of the zeolitic component. This may reduce the dealumination of the zeolitic component that occurs during steaming, which can lead to a reduction in acidity and catalytic activity of the zeolitic component.

One or more of the zeolitic components of the FCC catalyst composition 122 may include one or more phosphorous-containing compounds in an amount of from 1 wt. % to 20 wt. % based on the total weight of each zeolitic component. In embodiments, the phosphorous-containing compounds can be impregnated onto the ZSM-5 zeolite so that the ZSM-5 zeolite is impregnated with from 1 wt. % to 20 wt. % phosphorous-containing compounds based on the total weight of the ZSM-5 zeolite. For example, the ZSM-5 zeolite may be impregnated with from 1 wt. % to 20 wt. % phosphorous pentoxide based on the total weight of the ZSM-5 zeolite. In embodiments, the ZSM-5 zeolite can include from 1 wt. % to 15 wt. %, from 1 wt. % to 10 wt. %, from 1 wt. % to 5 wt. %, from 5 wt. % to 20 wt. %, from 5 wt. % to 15 wt. %, from 5 wt. % to 10 wt. %, from 10 wt. % to 20 wt. %, from 10 wt. % to 15 wt. %, from 15 wt. % to 20 wt. %, from 6 wt. % to 9 wt. %, or from 7 wt. % to 8 wt. % phosphorous pentoxide based on the total weight of the ZSM-5 zeolite. In specific embodiments, the ZSM-5 zeolite may include about 7.5 wt. % phosphorous pentoxide based on the total weight of the ZSM-5 zeolite.

The FCC catalyst composition 122 may include up to 40 wt. % ZSM-5 zeolite based on the total weight the FCC catalyst composition 122. For example, the FCC catalyst composition 122 may include up to 30 wt. %, up to 25 wt. %, or up to 20 wt. %, from 1 wt. % to 40 wt. %, from 1 wt. % to 30 wt. %, from 1 wt. % to 25 wt. %, from 1 wt. % to 20 wt. %, 5 wt. % to 40 wt. %, from 5 wt. % to 30 wt. %, from 5 wt. % to 25 wt. %, from 5 wt. % to 20 wt. %, 10 wt. % to 40 wt. %, from 10 wt. % to 30 wt. %, from 10 wt. % to 25 wt. %, from 10 wt. % to 20 wt. %, from 15 wt. % to 40 wt. %, from 15 wt. % to 30 wt. %, from 15 wt. % to 25 wt. %, or from 15 wt. % to 20 wt. % of the ZSM-5 zeolite impregnated with phosphorous based on the total weight of the FCC catalyst composition 122.

The FCC catalyst composition 122 may include a Y-type zeolite. The Y-type zeolite of the FCC catalyst composition 122 may operate to produce one or more olefins from the hydrocarbons in the hydroprocessed effluent 104. The Y-type zeolite may comprise an ultrastable Y-type (USY) zeolite. USY zeolites can be produced via the dealumination of one or more Y-type zeolites. As used in the present disclosure, the term "Y-type zeolite" refers to a zeolite having an FAU framework type according to the IUPAC zeolite nomenclature and consisting of silica and alumina. Without being bound by any particular theory, it is believed that the dealumination of the Y-type zeolite may result in a USY zeolite having a reduced number of acid sites. This reduced number of acid sites may result in a reduction of the rates of secondary reactions in the FCC system 120, such as the dehydrogenation or hydrogenation of olefins produced in the FCC system 120, when compared to Y-type zeolite that has not been dealuminated. As a result, USY zeolite may produce a greater yield of olefins when compared to Y-type zeolite.

The molar ratio of silica to alumina in the USY zeolite may be greater than or equal to 5, greater than or equal to 10, greater than or equal to 25, or even greater than or equal to 50. In embodiments, the molar ratio of silica to alumina in the USY zeolite may be from 5 to 50, from 5 to 25, from 5 to 10, from 10 to 50, from 10 to 25, or from 25 to 50. In embodiments, the molar ratio of silica to alumina in the USY zeolite can be about 30. In embodiments, the USY zeolite can also comprise one or more transition metals, such as zirconium, titanium, or hafnium, substituted into the framework of the zeolite.

The USY zeolite may have an average surface area of from 200 m$^2$/g to 900 m$^2$/g. For example, the USY zeolite may have an average surface area of from 200 m$^2$/g to 800 m$^2$/g, from 300 m$^2$/g to 900 m$^2$/g, from 300 m$^2$/g to 800 m$^2$/g, from 300 m$^2$/g to 700 m$^2$/g, from 300 m$^2$/g to 600 m$^2$/g, from 300 m$^2$/g to 500 m$^2$/g, from 350 m$^2$/g to 450 m$^2$/g, from 500 m$^2$/g to 900 m$^2$/g, or from 500 m$^2$/g to 800 m$^2$/g.

The USY zeolite may have an average total pore volume per unit weight of the USY zeolite of from 0.050 mL/g to 0.600 mL/g, such as from 0.050 mL/g to 0.500 mL/g.

One or more of the zeolitic components of the FCC catalyst composition 122 may include one or more rare earth metals or rare earth metal oxides, where the rare earth metal can be one or more of lanthanum, cerium, dysprosium, europium, gadolinium, holmium, lutetium, neodymium, praseodymium, promethium, samarium, scandium, terbium, thulium, ytterbium, yttrium, or combinations of these. Without being bound by any particular theory, it is believed that rare earth metals or metal oxides may improve the stability of the unit cells of the zeolitic component, increase the catalytic activity of the zeolitic component, or both. Moreover, it is believed that rare earth metals or metal oxides can function as vanadium traps, which act to sequester vanadium in the feed and prevent deleterious effects that vanadium can have on the zeolitic components of the catalyst. One or more of the zeolitic components of the FCC catalyst composition 122 may include one or more rare earth metals in an amount of from 1 wt. % to 5 wt. % based on the total weight of each zeolitic component. One or more of the zeolitic components of the FCC catalyst composition 122 may be impregnated with lanthanum or lanthanum oxide.

One or more of the zeolitic components of the FCC catalyst composition 122 may include one or more lanthanum-containing compounds, such as but not limited to lanthanum oxide, in an amount of from 1 wt. % to 5 wt. %, from 1 wt. % to 4 wt. %, from 1 wt. % to 3 wt. %, from 1 wt. % to 2 wt. %, from 2 wt. % to 5 wt. %, from 2 wt. % to 4 wt. %, from 2 wt. % to 3 wt. %, from 3 wt. % to 5 wt. %, from 3 wt. % to 4 wt. %, or from 4 wt. % to 5 wt. % based on the total weight of each zeolitic component.

The rare earth or rare earth oxide may be impregnated on the USY zeolite of the FCC catalyst composition 122. The FCC catalyst composition 122 may comprise USY zeolite impregnated with lanthanum oxide ($La_2O_3$). For example, the USY zeolite may include from 1 wt. % to 5 wt. %, from 1 wt. % to 4 wt. %, from 1 wt. % to 3 wt. %, from 1 wt. % to 2 wt. %, from 2 wt. % to 5 wt. %, from 2 wt. % to 4 wt. %, from 2 wt. % to 3 wt. %, from 3 wt. % to 5 wt. %, from 3 wt. % to 4 wt. %, or from 4 wt. % to 5 wt. % lanthanum oxide based on the total weight of the USY zeolite. In some specific embodiments, the USY zeolite can comprise about 2.5 wt. % lanthanum oxide based on the total weight of the USY zeolite.

The FCC catalyst composition 122 may include up to 40 wt. % USY zeolite based on the total weight the FCC catalyst composition 122. For example, the FCC catalyst composition 122 may include up to 30 wt. %, or up to 25 wt. %, from 1 wt. % to 40 wt. %, from 1 wt. % to 30 wt. %, from 1 wt. % to 25 wt. %, from 5 wt. % to 40 wt. %, from 5 wt. % to 30 wt. %, from 5 wt. % to 25 wt. %, from 10 wt. % to 40 wt. %, from 10 wt. % to 30 wt. %, from 10 wt. % to 25 wt. %, from 15 wt. % to 40 wt. %, from 15 wt. % to 30 wt. %, or from 15 wt. % to 25 wt. % USY zeolite impregnated with lanthanum based on the total weight of the FCC catalyst composition 122.

The FCC catalyst composition 122 may include one or more binder materials, such as alumina-containing compounds or silica-containing compounds (including compounds containing alumina and silica). As used in the present disclosure, "binder materials" refer to materials that serve to "glue" or otherwise hold components of the FCC catalyst composition 122. Binder materials can be included to improve the attrition resistance of the FCC catalyst composition 122. The binders may comprise alumina (such as amorphous alumina), silica-alumina (such as amorphous silica-alumina), or silica (such as amorphous silica). According to one or more embodiments, the binder material can comprise pseudoboehmite. As used in the present disclosure, "pseudoboehmite" refers to an aluminum-containing compound with the chemical composition AlO(OH) consisting of crystalline boehmite. While boehmite generally refers to aluminum oxide hydroxide as well, pseudoboehmite generally has a greater amount of water than boehmite. In embodiments, the binder material can comprise amorphous silica. The amorphous silica can be in the form of colloidal silica. As used throughout the present disclosure, the term "colloidal silica" refers to nano-sized particles of amorphous, non-porous silica. In embodiments, the FCC catalyst composition 122 can comprise an alumina binder, colloidal silica, or both.

The FCC catalyst composition 122 may include the one or more binders in an amount of from 5 wt. % to 30 wt. % based on the total weight of the FCC catalyst composition 122. For example, the FCC catalyst composition 122 may include the one or more binders in an amount of from 5 wt. % to 25 wt. %, from 5 wt. % to 20 wt. %, from 5 wt. % to 15 wt. %, from 5 wt. % to 10 wt. %, from 10 wt. % to 25 wt. %, from 10 wt. % to 20 wt. %, from 10 wt. % to 15 wt. %, from 15 wt. % to 30 wt. %, from 15 wt. % to 25 wt. %, from 15 wt. % to 20 wt. %, from 20 wt. % to 30 wt. %, from 20 wt. % to 25 wt. %, or from 25 wt. % to 30 wt. % based on the total weight of the FCC catalyst composition 122.

The FCC catalyst composition 122 may include an alumina binder in an amount of from 2 wt. % to 20 wt. % based on the total weight of the FCC catalyst composition 122. For example, the FCC catalyst composition 122 may include the alumina binder in an amount of from 2 wt. % to 15 wt. %, from 2 wt. % to 10 wt. %, from 5 wt. % to 20 wt. %, from 5 wt. % to 15 wt. %, from 5 wt. % to 10 wt. %, or from 7 wt. % to 9 wt. % based on the total weight of the FCC catalyst composition 122. In embodiments the FCC catalyst composition 122 can include about 8 wt. % alumina binder based on the total weight of the FCC catalyst composition 122.

The FCC catalyst composition 122 may include colloidal silica in an amount of from 0.5 wt. % to 5 wt. % based on the total weight of the FCC catalyst composition 122. For example, the FCC catalyst composition 122 may include colloidal silica in an amount of from 0.5 wt. % to 4 wt. %, from 0.5 wt. % to 3 wt. %, from 0.5 wt. % to 2 wt. %, from 1 wt. % to 4 wt. %, from 1 wt. % to 3 wt. %, from 1 wt. % to 2 wt. %, from 2 wt. % to 4 wt. %, or from 2 wt. % to 3 wt. % based on the total weight of the FCC catalyst composition 122. In embodiments the FCC catalyst composition 122 can include about 2 wt. % colloidal silica based on the total weight of the FCC catalyst composition 122. Without intending to be bound by any particular theory, it is believed that the colloidal silica can act as a binder and/or filler to provide additional physical strength and integrity to the FCC catalyst. Further, it is believed that the addition of colloidal silica to the FCC catalyst can improve the attrition resistance and/or stabilize catalytic activity of the FCC catalyst.

In embodiments, the FCC catalyst composition 122 may include one or more matrix materials, which may include one or more clay materials, such as but not limited to Kaolin clay. Without being bound by any particular theory, it is believed that the matrix materials of the FCC catalyst composition 122 can serve both physical and catalytic functions. Physical functions can include providing particle integrity and attrition resistance, acting as a heat transfer medium, and providing a porous structure to allow diffusion of hydrocarbons into and out of the catalyst microspheres. The matrix materials can also affect catalyst selectivity, product quality, and resistance to poisons. The matrix materials may tend to exert its strongest influence on overall catalytic properties for those reactions that directly involve relatively large molecules.

The matrix materials may include Kaolin clay. As used in the present disclosure, "Kaolin clay" refers to a clay material that has a relatively large amount (such as at least about 50 wt. %, at least 60 wt. %, at least 70 wt. %, at least 80 wt. %, at least 90 wt. %, or at least 95 wt. %) of kaolinite, which can be represented by the chemical formula $Al_2Si_2O_5(OH)_4$. The one or more matrix materials may comprise at least 50 wt. %, at least 60 wt. %, at least 70 wt. %, at least 80 wt. %, at least 90 wt. %, at least 95 wt. %, or even at least 99 wt. % of kaolinite.

The FCC catalyst composition 122 may include one or more matrix materials in an amount of from 30 wt. % to 60 wt. % based on the total weight of each of the FCC catalyst composition 122. The FCC catalyst composition 122 may include from 30 wt. % to 70 wt. %, from 30 wt. % to 60 wt. %, from 30 wt. % to 50 wt. %, from 30 wt. % to 45 wt. %, from 30 wt. % to 40 wt. %, from 30 wt. % to 35 wt. %, from 35 wt. % to 60 wt. %, from 35 wt. % to 55 wt. %, from 35 wt. % to 50 wt. %, from 35 wt. % to 45 wt. %, from 35 wt. % to 40 wt. %, from 40 wt. % to 60 wt. %, from 40 wt. % to 55 wt. %, from 40 wt. % to 50 wt. %, from 40 wt. % to 45 wt. %, from 45 wt. % to 60 wt. %, from 45 wt. % to 55 wt. %, from 45 wt. % to 50 wt. %, from 50 wt. % to 60 wt. %, from 50 wt. % to 55 wt. %, or from 55 wt. % to 60 wt. % matrix materials based on the total weight of the FCC catalyst composition 122.

The FCC catalyst composition 122 may include kaolin clay in an amount of from 30 wt. % to 60 wt. % based on the total weight of each of the FCC catalyst composition 122. For example, the FCC catalyst composition 122 may include from 30 wt. % to 70 wt. %, from 30 wt. % to 60 wt. %, from 30 wt. % to 50 wt. %, from 30 wt. % to 45 wt. %, from 30 wt. % to 40 wt. %, from 30 wt. % to 35 wt. %, from 35 wt. % to 60 wt. %, from 35 wt. % to 55 wt. %, from 35 wt. % to 50 wt. %, from 35 wt. % to 45 wt. %, from 35 wt. % to 40 wt. %, from 40 wt. % to 60 wt. %, from 40 wt. % to 55 wt. %, from 40 wt. % to 50 wt. %, from 40 wt. % to 45 wt. %, from 45 wt. % to 60 wt. %, from 45 wt. % to 55 wt. %, from 45 wt. % to 50 wt. %, from 50 wt. % to 60 wt. %, from 50 wt. % to 55 wt. %, or from 55 wt. % to 60 wt. % kaolin clay based on the total weight of the FCC catalyst composition 122.

The FCC catalyst composition 122 may comprise a plurality of catalyst particles, where each of the plurality of catalyst particles comprises the ZSM-5 zeolite impregnated with phosphorous pentoxide, the USY zeolite impregnated with lanthanum oxide, the alumina binder, the Kaolin clay, and the colloidal silica.

The FCC catalyst composition 122 can be formed by a variety of processes. According to one embodiment, the matrix material can be mixed with a fluid such as water to form a slurry, and the zeolites can be separately mixed with a fluid such as water to form a slurry. The matrix material slurry and the zeolite slurry can be combined under stirring. Separately, another slurry can be formed by combining the binder material with a fluid such as water. The binder slurry can then be combined with the slurry containing the zeolites and matrix material to form a final slurry. The final slurry can then be dried, for example by spraying, and then calcined to produce the microparticles of the cracking catalyst.

In embodiments, the FCC catalyst composition 122 can be in the form of shaped microparticles, such as microspheres. As used in the present disclosure, "microparticles" refer to particles having an average particle size of from 0.1 microns and 100 microns. The size of a microparticle refers to the maximum length of a particle from one side to another, measured along the longest distance of the microparticle. For instance, a spherically shaped microparticle has a size equal to its diameter, or a rectangular prism shaped microparticle has a maximum length equal to the hypotenuse stretching from opposite corners. In embodiments, each zeolitic component of the FCC catalyst composition 122 can be included in each catalyst microparticle. However, in other embodiments, microparticles can be mixed, where the microparticles contain only a portion of the FCC catalyst composition 122. For instance, a mixture of two microparticle types may be included in the FCC catalyst composition 122, where one type of microparticle includes only ZSM-5, and another type of microparticle includes only the USY zeolite.

The FCC catalyst composition 122 can be contacted with steam prior to use in the FCC system 120. The purpose of steam treatment can be to accelerate the hydrothermal aging of the FCC catalyst composition 122 that occurs during operation of the FCC system 120 to obtain an equilibrium catalyst. Not intending to be bound by any particular theory, it is believed that the steam treatment can lead to the removal of aluminum from the framework leading to a decrease in the number of sites where framework hydrolysis can occur under hydrothermal and thermal conditions. This removal of aluminum results in an increased thermal and hydrothermal stability in dealuminated zeolites. The unit cell size can decrease as a result of dealumination, since the smaller $SiO_4$ tetrahedron replaces the larger $AlO_4^-$ tetrahedron. The acidity of zeolites can also be affected by dealumination through the removal of framework aluminum and the formation of extra-framework aluminum species. Dealumination may affect the acidity of the zeolites by decreasing the total acidity and increasing the acid strength of the zeolite. The total acidity can decrease because of the removal of framework aluminum, which act as Brønsted acid sites. The acid strength of the zeolite may be increased because of the removal of paired acid sites or the removal of the second coordinate next nearest neighbor aluminum. The increase in the acid strength may be caused by the charge density on the proton of the OH group being highest when there is no framework aluminum in the second coordination sphere. In embodiments, the FCC catalyst composition 122 can be contacted with steam at a temperature greater than or equal to 800° C. for a period of 6 hours or greater prior to contacting the hydrocracked effluent 104 with the FCC catalyst composition 122 in the FCC system 120.

In embodiments, one or more supplemental feed streams can be combined with the hydroprocessed effluent 104 before introduction of the hydroprocessed effluent 104 to the FCC catalyst 122. The one or more supplemental feed streams may be added such that it contacts the FCC catalyst 122 simultaneously with the hydroprocessed effluent 104. The supplemental feed stream may include one or more of vacuum residues, tar sands, bitumen, atmospheric residues, vacuum gas oils, demetalized oils, naphtha streams, or combinations of these.

Hydrocarbons from the hydrocracked effluent 104 may be contacted with the FCC catalyst composition 122, which may cause at least a portion of the hydrocarbons from the hydrocracked effluent 104 to undergo one or more catalytic cracking reactions to form one or more cracking reaction products, which can include one or more olefins.

As noted previously, embodiments of the present disclosure include contacting the hydroprocessed effluent 104 with the FCC catalyst composition 122 that includes ZSM-5 zeolite impregnated with phosphorous, USY zeolite impregnated with lanthanum oxide, an alumina binder, colloidal silica, and a matrix material comprising Kaolin clay. The inclusion of two or more different zeolitic components can increase the selectivity and yield of the FCC process for producing light olefins across the entire range of some unconventional hydrocarbon feeds for fluid catalytic cracking processes, such as crude oil. The FCC catalyst composition 122 may be particularly suited for catalytically cracking crude oil under high-severity reaction conditions to produce increased olefin yield compared to conventional FCC catalysts. Without being bound by any particular theory, it is believed that the different zeolitic components can be active enough to promote the catalytic cracking of lighter hydrocarbons and mild enough to avoid the excessive catalytic cracking, such as continued cracking of light olefin and light aromatic product compounds. This balanced activity provided by the mixture of zeolite components can increase the yield of products, such as light olefins, from the catalytic cracking of both light hydrocarbons and heavy hydrocarbons present in crude oil.

Cracked Effluent

The cracked effluent 126 may comprise at least 15 wt. % light olefins. Light olefins refers to olefins which include from two to four carbon atoms. For example, the cracked effluent may comprise at least 20 wt. %, at least 25 wt. %, at least 30 wt. %, at least 35 wt. %, at least 40 wt. %, or at least 43 wt. % of light olefins.

The cracked effluent 126 may comprise at least 2 wt. % of $C_2$ olefins. For example, the cracked effluent may comprise at least 4 wt. %, at least 6 wt. %, or at least 8 wt. % of $C_2$ olefins.

The cracked effluent 126 may comprise at least 2 wt. % of $C_3$ olefins. For example, the cracked effluent may comprise at least 5 wt. %, at least 10 wt. %, at least 15 wt. %, or at least 20 wt. % of $C_3$ olefins.

The cracked effluent 126 may comprise at least 2 wt. % of $C_4$ olefins. For example, the cracked effluent may comprise at least 5 wt. %, at least 10 wt. %, at least 12 wt. % of $C_4$ olefins.

The cracked effluent 126 may comprise at least 5 wt. % of gasoline range products. For example, the cracked effluent may comprise at least 10 wt. %, at least 20 wt. %, at least 25 wt. %, or at least 30 wt. % of gasoline range products.

Further, embodiments of the present disclosure may provide catalysts with a reduced deactivation rate during catalytic cracking of crude oil that is added directly to the FCC system. The reduced deactivation rate of the catalyst may improve the economics of catalytically cracking crude oil to form light olefins, among other features.

EXAMPLES

The various aspects of the present disclosure will be further clarified by the following examples. The examples are illustrative in nature and should not be understood to limit the subject matter of the present disclosure.

Example 1: Hydrotreating of Arab Heavy Crude Oil

In Example 1, an Arab Heavy Crude Oil was introduced to a three layer hydroprocessing unit. The first layer was a commercially available KFR-22 hydrodemetallization catalyst from Albermarle Corp. The second layer was a commercially available KFR-33 hydrodesulfurization catalyst from Albermarle Corp. The third layer was a KFR-70 hydrodearomatization catalyst from Albermarle Corp. The crude oil was introduced at the top and flowed downward such that it contacted the KFR-22, then the KFR-33, then the KFR-70, before leaving at the bottom of the reactor as the hydroprocessed effluent. The reactor conditions were as shown in Table 1.

The properties of the crude oil and the hydroprocessed effluent are shown in Tables 2-3. As indicated in the tables, density, nitrogen, and sulfur content were determined according to American Society for Testing and Materials (ASTM) procedures. Fe, Na, Ni, and V content were determined through inductively coupled plasma according to ASTM D5185-18. As can be seen, hydroprocessing results in at least a 99.7% reduction in sulfur and a 96.9% reduction in nitrogen concentration. It further results in at least a 93% reduction in Ni and a 98% reduction in vanadium.

The Arab Heavy crude oil had an IBP of 102° C., an FBP of greater than 720° C. a paraffin content of 22 wt. %, a naphthenes content of 10.5 wt. %, an aromatics content of 45.3 wt. %, and a polyaromatics content of 22.1 wt. %

Simulated distillation was performed according to ASTM D-7169 on both the Arab heavy crude oil and the hydroprocessed effluent. Results are given in Table 3.

TABLE 1

| | |
|---|---|
| Temp (° C.) | 400 |
| Pressure bar | 150 |
| LHSV (h$^{-1}$) | 0.30 |
| Oil flow rate ml/h | 45 |
| $H_2$ flow rate (L/h) | 54 |

TABLE 2

| | Arab Heavy Crude | | Hydroprocessed Effluent | | Test Method |
|---|---|---|---|---|---|
| Density @ 15.6° C. | 0.8920 | g/cm$^3$ | 0.8416 | | ASTM D-4052 |
| N | 1952 | ppm | 59.6 | ppm | ASTM D-4629 |
| S | 2.68 | wt. % | 0.008 | wt. % | ASTM D-4294 |
| Fe | <10 | ppm | <1 | ppm | IP 501 |
| Na | 1 | ppm | <1 | ppm | IP 501 |
| Ni | 16 | ppm | <1 | ppm | IP 501 |
| V | 51 | ppm | <1 | ppm | IP 501 |

TABLE 3

Simulated Distillation of Arab Heavy and Hydroprocessed effluent

| Cutoff | Arab Heavy | Hydroprocessed Effluent |
|---|---|---|
| 05 wt. % | 102° C. | 134.44° C. |
| 10 wt. % | 143° C. | 161.67° C. |
| 20 wt. % | 223° C. | 208.33° C. |
| 30 wt. % | 293° C. | 251.11° C. |
| 40 wt. % | 362° C. | 288.89° C. |
| 50 wt. % | 431° C. | 327.22° C. |
| 60 wt. % | 506° C. | 367.22° C. |
| 70 wt. % | 591° C. | 411.67° C. |
| 80 wt. % | 690° C. | 460.00° C. |
| 90 wt. % | 720° C. | 513.33° C. |
| 95 wt. % | >720° C. | 538.89° C. |
| FBP | >720° C. | 571.67° C. |

Example 2: Preparation of the FCC Catalyst Composition

In Example 2, an FCC catalyst composition according to the present disclosure was prepared. The materials used in preparing the FCC catalyst composition of Example 1 are provided below in Table 4.

TABLE 4

| Chemical | Supplier |
| --- | --- |
| LUDOX ® TM40 colloidal silica ($SiO_2$) | DuPont |
| Sodium hydroxide (NaOH) | Sigma Aldrich |
| Y zeolite (CBV-780) | Zeolyst International |
| ZSM-5 zeolite (CBV-3024E) | Zeolyst International |
| Formic acid | Sigma Aldrich |
| Clay | Petrobras |
| Alumina, PURAL ™ SB Grade | Petrobras |
| Diammonium hydrogen phosphate | Sigma Aldrich |
| Lanthanum nitrate (III) hydrate | Fluka |

To prepare the FCC catalyst composition of Example 2, the ZSM-5 zeolite (commercially available as CBV-3024-E from Zeolyst International) was impregnated with 7.5 wt. % phosphorous pentoxide, and the USY zeolite (commercially available as CBV-780 from Zeolyst International) was impregnated with 2.5 wt. % lanthanum oxide. The ZSM-5 zeolite had an average silica-to-alumina ratio of 30 and an average surface area of 405 $m^2/g$. The USY zeolite had an average total pore volume per unit weight of 0.486 $cm^3/g$. The ZSM-5 zeolite impregnated with phosphorous pentoxide and the USY zeolite impregnated with lanthanum oxide were combined with water, the alumina binder, the colloidal silica, and the Kaolin clay to produce a mixture. The mixture was stirred for 1 hour and the resulting slurry was placed in a temperature-programmed oven for drying and calcination to produce FCC catalyst composition particles. The FCC catalyst composition particles were ground to a fine powder by means of a mortar and a pestle. Then, the ground FCC catalyst composition microparticles were sieved for a fraction between 40-120 micrometers (μm) and used for characterization and evaluation. The composition of the FCC catalyst composition microparticles of Example 2 is provided in Table 4.

TABLE 4

| Component | Weight % | Notes |
| --- | --- | --- |
| ZSM-5 | 20 | Phosphorus impregnated at 7.5 wt. % $P_2O_5$ on zeolite |
| USY | 21 | Lanthanum impregnated at 2.5 wt. % $La_2O_3$ on zeolite |
| Alumina | 8 | Pural SB from Sasol |
| Clay | 49 | Kaolin |
| Silica | 2 | Added as colloidal silica Ludox TM-40 |

Example 3: FCC of the Hydroprocessed Effluent of Example 1

In Example 3, the performance of the FCC catalyst composition of Example 2 was evaluated for cracking the hydroprocessed effluent produced by hydroprocessing Arab Heavy crude oil in Example 1. The properties of Arab Heavy crude oil utilized in the examples were previously shown in Tables 2-3. The catalytic cracking with the FCC catalyst composition of Example 2 was carried out in a Sakuragi Rikagaku (Japan) Micro Activity Test (MAT) instrument using a quartz tubular reactor. The FCC catalyst composition of Example 2 was evaluated for cracking the hydroprocessed effluent of Example 1, according to standard test method ASTM D-3907. Prior to evaluation, the FCC catalyst composition was steamed at 810° C. for 6 hours prior to conducting the cracking reactions. The experiments were conducted in the MAT unit at 30 seconds time-on-stream (TOS). The cracking reaction was conducted at a temperature of 650° C. and at a catalyst to oil weight ratio of about 5.

After each reaction, the FCC catalyst composition microparticles were stripped using nitrogen ($N_2$) at a flow rate of 30 milliliters per minute (mL/min). The liquid product was collected in a liquid receiver and the gaseous products were collected in a gas burette by water displacement and sent to the gas chromatograph (GC) for analysis. The used catalysts were used to measure the amount of generated coke from the reaction.

The MAT results from the cracking of the hydroprocessed effluent of Example 1 over the FCC catalyst composition of Example 2 are shown in Table 5. As can be seen, high light olefin yields of greater than 42 wt. % were obtained using the FCC catalyst composition of Example 2.

TABLE 5

| Conditions | |
| --- | --- |
| Temp. (° C.) | 650 |
| Injection Time (s) | 30 |
| Steaming conditions | 810° C., 6 h |
| Mass Balance (%) | 97.01 |
| CAT/OIL (CTO) | 4.56 |
| Conversion (%) | 91.97 |
| Yields (mass %) | |
| H2 | 0.582 |
| C1 | 2.71 |
| C2 | 2.15 |
| C2= | 8.39 |
| C3 | 2.39 |
| C3= | 21.43 |
| iC4 | 2.30 |
| nC4 | 0.98 |
| t2C4= | 2.90 |
| 1C4= | 2.59 |
| iC4= | 4.68 |
| c2C4= | 2.46 |
| 1,3-BD | 0.151 |
| C4= (Liq.) | 0.150 |
| Total Gas | 53.87 |
| Gasoline | 34.84 |
| LCO | 7.21 |
| HCO | 0.83 |
| Coke | 3.26 |
| Groups (mass %) | |
| H2 – C2 (dry gas) | 13.83 |
| C3 – C4 (LPG) | 40.04 |
| C2= – C4= (Light olefins) | 42.75 |
| C3= +C4= | 34.36 |
| C4= (Butenes) | 12.93 |
| Molar ratio (mol/mol) | |
| C2=/C2 | 4.19 |
| C3=/C3 | 9.38 |
| C4=/C4 | 4.09 |
| iC4=/C4= | 0.362 |
| iC4=/iC4 | 2.11 |
| Alternate Conversion | |
| Total Gas + Coke (wt. %) | 57.12 |

Comparative Example 1

A comparative example was performed using the Arab Heavy crude oil of Example 1 and following the method of Example 3. The Comparative Example was not hydrotreated. Results for the FCC cracking of the Comparative Example are given in Table 6.

TABLE 6

| Conditions | |
|---|---|
| Temp. (° C.) | 650 |
| Injection Time (s) | 30 |
| Catalyst code | MAH6 |
| Steaming conditions | 810° C. for 6 h |
| Feed code | AH |
| CAT/OIL | 5 |
| Conversion (%)☐ | 86.86 |
| Yields (mass%) | |
| H2 | 0.53 |
| C1 | 4.66 |
| C2 | 3.44 |
| C2= | 9.73 |
| C3 | 2.88 |
| C3= | 17.93 |
| iC4 | 1.02 |
| nC4 | 1.52 |
| t2C4= | 2.03 |
| 1C4= | 1.86 |
| iC4= | 3.15 |
| c2C4= | 1.69 |
| 1,3-BD | 0.13 |
| C4= (Liq.) | 0.03 |
| Total Gas | 50.61 |
| Gasoline | 26.08 |
| LCO | 10.31 |
| HCO | 2.84 |
| Coke | 10.17 |
| Groups (mass%) | |
| H2 – C2 (dry gas) | 18.36 |
| C3 – C4 (LPG) | 32.25 |
| C2= –C4= (Light olefins) | 36.56 |
| C3= +C4= | 26.82 |
| C4= (Butenes) | 8.90 |

The Comparative Example shows that cracking Arab Heavy crude (not hydrotreated) gave lower yields of light olefins than did cracking the hydrotreated Arab Heavy in Example 1. Hydrotreatment is shown here to improve the reactivity of the crude by converting the unreactive polyaromatics into reactive paraffins and naphthenes.

Example 4: Evaluation of Contaminants on Equilibrium Catalyst

In Example 4, the deactivation rate of the FCC catalyst composition of Example 3 and of Comparative Example 1 were estimated. Industrially, FCC catalyst deactivation is evaluated based on nickel (Ni) and vanadium (V) content accumulated on the equilibrium catalyst (E-Cat). A catalyst can be considered E-Cat after it has circulated between the regenerator and the FCC reactor for days of continuous operation. The deactivation of the FCC catalyst is promoted mainly by two factors, namely steam and feed contaminants. Industrially, deactivation of the FCC catalyst is evaluated by withdrawing a sample of the E-Cat from the FCC system and analyzing the sample for Ni and V content. In Example 3 and Comparative Example 1, the FCC catalyst composition was passed once through the MAT unit and, therefore, may not be fully representative of an industrial E-Cat. Alternatively, the FCC catalyst composition of Example 1 was steam deactivated at 810° C. for 6 hours and, thus, can be considered representative of an industrial E-Cat.

Alongside steam deactivating the catalysts, established equations in the literature, which are based on the metals balance around the unit (Metals$_{in}$–Metals$_{out}$=Metals Accumulated), are used to estimate how much Ni and V would accumulate on the FCC catalyst composition of Example 1 at an equilibrium state. For instance, Fluid Catalytic Cracking Handbook, 4$^{th}$ Edition, Sadeghbeigi, 2020 provides equations for estimating Ni and V accumulation on FCC catalysts. These equations estimate Ni and V content on the E-Cat based on their level in the feed (AL crude in these examples) and a daily catalyst addition rate. A first order differential equation (Eqn. 1) with the solution: $C_\alpha M_e$ is shown below:

$$M_e = A + [M_0 - A] \times e^{-\left(\frac{-C_q \times T}{I}\right)}; \quad \text{(Eqn. 1)}$$

where:

$M_e$=E-cat metals content, parts per million by weight (ppmw);
$A=(W \times M_f)/C_a$;
W=Feed rate, pounds per day (lb/day);
$M_f$=Feed metals, ppmw;
$C_\alpha$=Catalyst addition rate, lb/day;
$M_0$=Initial metals on the E-cat, ppmw;
T=time, day;
I=Catalyst inventory, pounds (lb.); and
B=Catalyst addition rate, pounds of catalyst per barrel of feed, where a barrel is equal to 42 U.S. gallons.

At steady state, the concentration of any metal on catalyst is approximated using the following equation (Eqn. 2):

$$M_e = ((141.5/(131.5+°API_{feed}) \times 350.4 \times M_f)/B \quad \text{(Eqn. 2)};$$

where $°API_{feed}$=American Petroleum Institute gravity of the feed, degrees.

The feed rate of crude oil was 76,500 barrels per day. After implementing the above equations, it was found that the keeping the calculated Ni+V in the FCC catalyst compositions below the 10,000 ppm limit for deactivation required a feed of 85 tons/day of fresh catalyst when using the method of Comparative Example 1. Using the method of Example 3 and the same feed rate, only 30 tons/day of fresh catalyst was required to achieve an equilibrium Ni+V of less than 2000 ppm. This is believed to be because the feed to the FCC in Comparative Example 1 had a Ni+V content of 67 ppm, while the feed to the FCC of Example 3 had a Ni+V content of less than 2 ppm after hydroprocessing.

ASPECTS

According to a first aspect of the present disclosure, a process for converting crude oil comprises contacting a crude oil with one or more hydroprocessing catalysts 112 to produce a hydroprocessed effluent wherein the crude oil has an API gravity from 25 to 29; and contacting the hydroprocessed effluent with a fluidized catalytic cracking (FCC) catalyst composition in an FCC system to produce cracked effluent comprising at least olefins, wherein the FCC system operates at a temperature of greater than or equal to 580° C., a weight ratio of the FCC catalyst composition to the crude oil of from 2:1 to 10:1, and a residence time of from 0.1 seconds to 60 seconds, and wherein the FCC catalyst composition comprises: ultrastable Y-type zeolite (USY zeolite) impregnated with lanthanum; ZSM-5 zeolite impregnated with phosphorous; an alumina binder; colloidal silica; and a matrix material comprising Kaolin clay.

According to a second aspect of the present disclosure, alone or in combination with any previous aspect, the one or more hydroprocessing catalysts 112 comprises one or more of a hydrodemetallization catalyst, a hydrodesulfurization catalyst, or a hydrodearomatization catalyst.

According to a third aspect of the present disclosure, alone or in combination with any previous aspect, the one or more hydroprocessing catalysts 112 comprises a hydrodemetallization catalyst, a hydrodesulfurization catalyst, and a hydrodearomatization catalyst.

According to a fourth aspect of the present disclosure, alone or in combination with any previous aspect, the FCC catalyst composition comprises from 10 wt. % to 30 wt. % USY zeolite impregnated with lanthanum.

According to a fifth aspect of the present disclosure, alone or in combination with any previous aspect, the FCC catalyst composition comprises from 10 wt. % to 40 wt. % ZSM-5 zeolite impregnated with phosphorous.

According to a sixth aspect of the present disclosure, alone or in combination with any previous aspect, the USY zeolite is impregnated with from 1 wt. % to 5 wt. % lanthanum oxide based on the total weight of the USY zeolite.

According to a seventh aspect of the present disclosure, alone or in combination with any previous aspect, the ZSM-5 zeolite is impregnated with from 1 wt. % to 15 wt. % phosphorous pentoxide based on the total weight of the ZSM-5 zeolite.

According to an eighth aspect of the present invention, the FCC catalyst composition comprises from 19-23 wt. % USY zeolite impregnated with lanthanum, from 18-22 wt. % ZSM-5 zeolite impregnated with phosphorous, from 6-10 wt. % alumina binder, from 47-51 wt. % Kaolin clay, and from 0.1-4 wt. % colloidal silica, wherein the weight percentages are based on the total weight of the FCC catalyst composition.

According to a ninth aspect of the present disclosure, alone or in combination with any previous aspect, the crude oil has a density of greater than 0.8 grams per milliliter at 15 degrees Celsius.

According to a tenth aspect of the present disclosure, alone or in combination with any previous aspect, the crude oil has an initial boiling point from 30 degrees Celsius to 50 degrees Celsius and an end boiling point greater than 720 degrees Celsius.

According to an eleventh aspect of the present disclosure, alone or in combination with any previous aspect, at least 50 weight percent of the crude oil has a boiling point temperature greater than or equal to 300 degrees Celsius.

According to a twelfth aspect of the present disclosure, alone or in combination with any previous aspect, the crude oil has a concentration of paraffin compounds of less than 50 wt. % per unit weight of the crude oil.

According to a thirteenth aspect of the present disclosure, alone or in combination with any previous aspect, the crude oil has a concentration of aromatic compounds of greater than or equal to 20 wt. % per unit weight of the crude oil.

According to a fourteenth aspect of the present disclosure, alone or in combination with any previous aspect, the crude oil is an Arab Heavy crude oil.

According to a fifteenth aspect of the present disclosure, alone or in combination with any previous aspect, the hydroprocessed effluent is contacted with the FCC catalyst composition at a temperature of from 600° C. to 700° C.

According to a sixteenth aspect of the present disclosure, alone or in combination with any previous aspect, the hydroprocessed effluent is contacted with the FCC catalyst composition for a residence time of from 20 seconds to 40 seconds.

According to a seventeenth aspect of the present disclosure, alone or in combination with any previous aspect, the FCC system is a downflow FCC system.

According to an eighteenth aspect of the present disclosure, alone or in combination with any previous aspect, the crude oil is contacted with the one or more hydroprocessing catalysts 112 at a temperature of at least 350° C.

According to a nineteenth aspect of the present disclosure, alone or in combination with any previous aspect, the crude oil has an API gravity of from 27 to 28.

According to a twentieth aspect of the present disclosure, alone or in combination with any previous aspect, the one or more hydroprocessing catalysts 112 comprises a hydrodemetallization catalyst, a hydrodesulfurization catalyst, and a hydrodearomatization catalyst; and the FCC catalyst composition comprises a plurality of catalyst particles, where each of the plurality of catalyst particles comprises the ZSM-5 zeolite impregnated with phosphorous, the USY zeolite impregnated with lanthanum, the alumina binder, the Kaolin clay, and the colloidal silica.

It is noted that any two quantitative values assigned to a property may constitute a range of that property, and all combinations of ranges formed from all stated quantitative values of a given property are contemplated in this disclosure.

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

Having described the subject matter of the present disclosure in detail and by reference to specific aspects, it is noted that the various details of such aspects should not be taken to imply that these details are essential components of the aspects. Rather, the claims appended hereto should be taken as the sole representation of the breadth of the present disclosure and the corresponding scope of the various aspects described in this disclosure. Further, it will be apparent that modifications and variations are possible without departing from the scope of the appended claims.

What is claimed is:

1. A process for converting crude oil comprising:
   contacting a crude oil with hydrogen and one or more hydroprocessing catalysts at a hydrogen partial pressure of at least 75 bar to produce a hydroprocessed effluent wherein the crude oil has an API gravity from 25 to 29; and
   contacting the hydroprocessed effluent with a fluidized catalytic cracking (FCC) catalyst composition in an FCC system to produce cracked effluent comprising at least olefins, wherein the FCC system operates at a temperature of greater than or equal to 580° C., a weight ratio of the FCC catalyst composition to the crude oil of from 2:1 to 10:1, and a residence time of from 0.1 seconds to 60 seconds, and
   wherein the FCC catalyst composition comprises:
   ultrastable Y-type zeolite (USY zeolite) impregnated with lanthanum;
   ZSM-5 zeolite impregnated with phosphorous;

an alumina binder;
colloidal silica; and
a matrix material comprising Kaolin clay.

2. The process of claim 1, wherein the one or more hydroprocessing catalysts comprises one or more of a hydrodemetallization catalyst, a hydrodesulfurization catalyst, or a hydrodearomatization catalyst.

3. The process of claim 1, wherein the one or more hydroprocessing catalysts comprises a hydrodemetallization catalyst, a hydrodesulfurization catalyst, and a hydrodearomatization catalyst.

4. The process of claim 1, wherein the FCC catalyst composition comprises from 10 wt. % to 30 wt. % USY zeolite impregnated with lanthanum.

5. The process of claim 1, wherein the FCC catalyst composition comprises from 10 wt. % to 40 wt. % ZSM-5 zeolite impregnated with phosphorous.

6. The process of claim 1, wherein the USY zeolite is impregnated with from 1 wt. % to 5 wt. % lanthanum oxide based on the total weight of the USY zeolite.

7. The process of claim 1, wherein the ZSM-5 zeolite is impregnated with from 1 wt. % to 15 wt. % phosphorous pentoxide based on the total weight of the ZSM-5 zeolite.

8. The process of claim 1, wherein the FCC catalyst composition comprises from 19-23 wt. % of the USY zeolite impregnated with lanthanum, from 18-22 wt. % of the ZSM-5 zeolite impregnated with phosphorous, from 6-10 wt. % of the alumina binder, from 47-51 wt. % of the Kaolin clay, and from 0.1-4 wt. % of the colloidal silica, wherein the weight percentages are based on the total weight of the FCC catalyst composition.

9. The process of claim 1, wherein the crude oil has a density of greater than 0.8 grams per milliliter at 15 degrees Celsius.

10. The process of claim 1, wherein the crude oil has an initial boiling point from 30 degrees Celsius to 50 degrees Celsius and an end boiling point greater than 720 degrees Celsius.

11. The process of claim 1, wherein at least 50 weight percent of the crude oil has a boiling point temperature greater than or equal to 300 degrees Celsius.

12. The process of claim 1, wherein the crude oil has a concentration of paraffin compounds of less than 50 wt. % per unit weight of the crude oil.

13. The process of claim 1, wherein the crude oil has a concentration of aromatic compounds of greater than or equal to 20 wt. % per unit weight of the crude oil.

14. The process of claim 1, wherein the crude oil is an Arab Heavy crude oil.

15. The process of claim 1, wherein the hydroprocessed effluent is contacted with the FCC catalyst composition at a temperature of from 600° C. to 700° C.

16. The process of claim 1, wherein the hydroprocessed effluent is contacted with the FCC catalyst composition for a residence time of from 0.1 seconds to 60 seconds.

17. The process of claim 1, wherein the FCC system is a downflow FCC system.

18. The process of claim 1, wherein the crude oil is contacted with the one or more hydroprocessing catalysts at a temperature of at least 350° C.

19. The process of claim 1, wherein the API gravity of the crude oil is from 27 to 28.

20. The process of claim 1, wherein
the one or more hydroprocessing catalysts comprises a hydrodemetallization catalyst, a hydrodesulfurization catalyst, and a hydrodearomatization catalyst; and
the FCC catalyst composition comprises a plurality of catalyst particles, where each of the plurality of catalyst particles comprises the ZSM-5 zeolite impregnated with phosphorous, the USY zeolite impregnated with lanthanum, the alumina binder, the Kaolin clay, and the colloidal silica.

* * * * *